United States Patent
Sugiyama et al.

(10) Patent No.: US 9,874,289 B2
(45) Date of Patent: Jan. 23, 2018

(54) VALVE MAIN UNIT AND METHOD OF MANUFACTURING THE SAME

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Kazuhisa Sugiyama, Okazaki (JP); Koji Nishi, Anjo (JP); Yutaka Inada, Kariya (JP); Eiji Okawachi, Toyota (JP); Akira Yamashita, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 14/541,506

(22) Filed: Nov. 14, 2014

(65) Prior Publication Data
US 2015/0137022 A1    May 21, 2015

(30) Foreign Application Priority Data

Nov. 21, 2013 (JP) ................................ 2013-241178

(51) Int. Cl.
    *F16K 27/00* (2006.01)
    *F16K 25/04* (2006.01)
    *C25D 11/04* (2006.01)

(52) U.S. Cl.
    CPC .............. *F16K 25/04* (2013.01); *C25D 11/04* (2013.01); *F16K 27/00* (2013.01)

(58) Field of Classification Search
    CPC .......... F16K 25/04; F16K 27/00; C25D 11/04
    USPC ....................... 251/368; 205/84, 95, 131, 151
    See application file for complete search history.

(56) References Cited

U.S. PATENT DOCUMENTS

| 2,760,925 A | 8/1956 | Bryant |
| 5,958,206 A * | 9/1999 | Rothbauer ............ B60T 8/3675 |
| | | 204/224 R |
| 7,472,887 B2 * | 1/2009 | Ohmi ........................ F16K 7/14 |
| | | 251/331 |
| 2011/0072888 A1 | 3/2011 | Ambrose et al. |

FOREIGN PATENT DOCUMENTS

| DE | 2016250 A1 | 10/1971 |
| EP | 1 593 888 A1 | 11/2005 |
| EP | 2 130 952 A1 | 12/2009 |

(Continued)

OTHER PUBLICATIONS

May 4, 2015 extended Search Report issued in European Patent Application No. 14193848.0.

(Continued)

*Primary Examiner* — Marina Tietjen
(74) *Attorney, Agent, or Firm* — Oliff PLC

(57) ABSTRACT

A valve main unit, in which a high pressure valve is to be provided, includes a channel for hydrogen gas. An internal surface of the channel is constituted by an oxidation layer formed by performing anodizing on an aluminum-based alloy. The oxidation layer of the channel is formed by performing the anodizing under a condition in which the oxidation layer with a thickness of 8 μm or less is formed at an external surface of the valve main unit, the external surface having an opening communicating with the channel.

5 Claims, 2 Drawing Sheets

(56) References Cited

FOREIGN PATENT DOCUMENTS

| JP | 2005-291434 A | 10/2005 |
|---|---|---|
| JP | A-2010-38247 | 2/2010 |
| JP | 2012-202428 A | 10/2012 |
| JP | A-2013-29161 | 2/2013 |

OTHER PUBLICATIONS

May 9, 2017 Office Action issued in Japanese Patent Application No. 2013-241178.

* cited by examiner

VALVE MAIN UNIT AND METHOD OF MANUFACTURING THE SAME

INCORPORATION BY REFERENCE

The disclosure of Japanese Patent Application No. 2013-241178 filed on Nov. 21, 2013 including the specification, drawings and abstract is incorporated herein by reference in its entirety.

BACKGROUND OF THE INVENTION

1. Field of the Invention

The present invention relates to a valve main unit included in a valve device and to a method of manufacturing the valve main unit.

2. Description of Related Art

A valve device that controls a high-pressure hydrogen gas flow is provided in, for example, a fuel cell vehicle. The valve device includes: a valve main unit including a hydrogen gas channel; and a high pressure valve that controls a hydrogen gas flow (see JP 2013-029161 A and JP 2010-038247 A). In the valve main unit, part of the channel includes a valve housing portion that houses the high pressure valve. As described in the paragraph [0021] of JP 2013-029161 A, the valve housing portion is subjected to anodic oxide coating that includes anodizing of an aluminum alloy.

In a valve main unit in which a high pressure valve is provided, a relatively large fluctuation of hydrogen gas pressure occurs in a channel while the high pressure valve is operated. That is, a repeated load is applied to the channel due to the operation of the high pressure valve. Meanwhile, anodizing of a channel (valve housing portion) in a valve main unit made of an aluminum-based alloy has an advantage in terms of improving, for example, corrosion resistance of the channel. However, the above-described repeated load is applied to an oxidation layer formed by anodizing. Accordingly, there is room for improvement in increasing durability of the channel for the hydrogen gas against the repeated load.

SUMMARY OF THE INVENTION

The present invention provides a valve main unit in which durability of a channel for hydrogen gas against a repeated load due to an operation of a high pressure valve is easily increased, and a method of manufacturing the valve main unit.

A first aspect of the present invention relates to a valve main unit in which a high pressure valve is to be provided. The valve main unit includes a channel for hydrogen gas. An internal surface of the channel is constituted by an oxidation layer formed by performing anodizing on an aluminum-based alloy. The oxidation layer of the channel is formed by performing the anodizing under a condition in which the oxidation layer with a thickness of 8 µm or less is formed at an external surface of the valve main unit, the external surface having an opening communicating with the channel.

The present inventors have found that, in an aluminum-based alloy on which an oxidation layer is formed by performing anodizing, as the thickness of the oxidation layer becomes thinner, durability against plate bending fatigue is likely to increase. Based on such findings, the oxidation layer of the channel is formed by performing the anodizing under the condition in which the oxidation layer with the thickness of 8 µm or less is formed at the external surface of the valve main unit, the external surface having the opening communicating with the channel. This configuration allows the oxidation layer of the channel to be formed at the thickness of 8 µm or less. That is, since the thickness of the oxidation layer of the channel is set to be small, the increased durability of the oxidation layer against the plate bending fatigue is easily obtained.

A second aspect of the present invention relates to a method of manufacturing a valve main unit which includes a channel for hydrogen gas and in which a high pressure valve is to be provided, wherein an internal surface of the channel is constituted by an oxidation layer. The method includes producing a semifinished product using an aluminum-based alloy; and performing anodizing on the semifinished product. The anodizing is performed under a condition in which the oxidation layer with a thickness of 8 µm or less is formed at an external surface of the valve main unit, the external surface having an opening communicating with the channel.

According to the above aspects of the present invention, the durability of the channel for the hydrogen gas against the repeated load due to the operation of the high pressure valve is easily increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
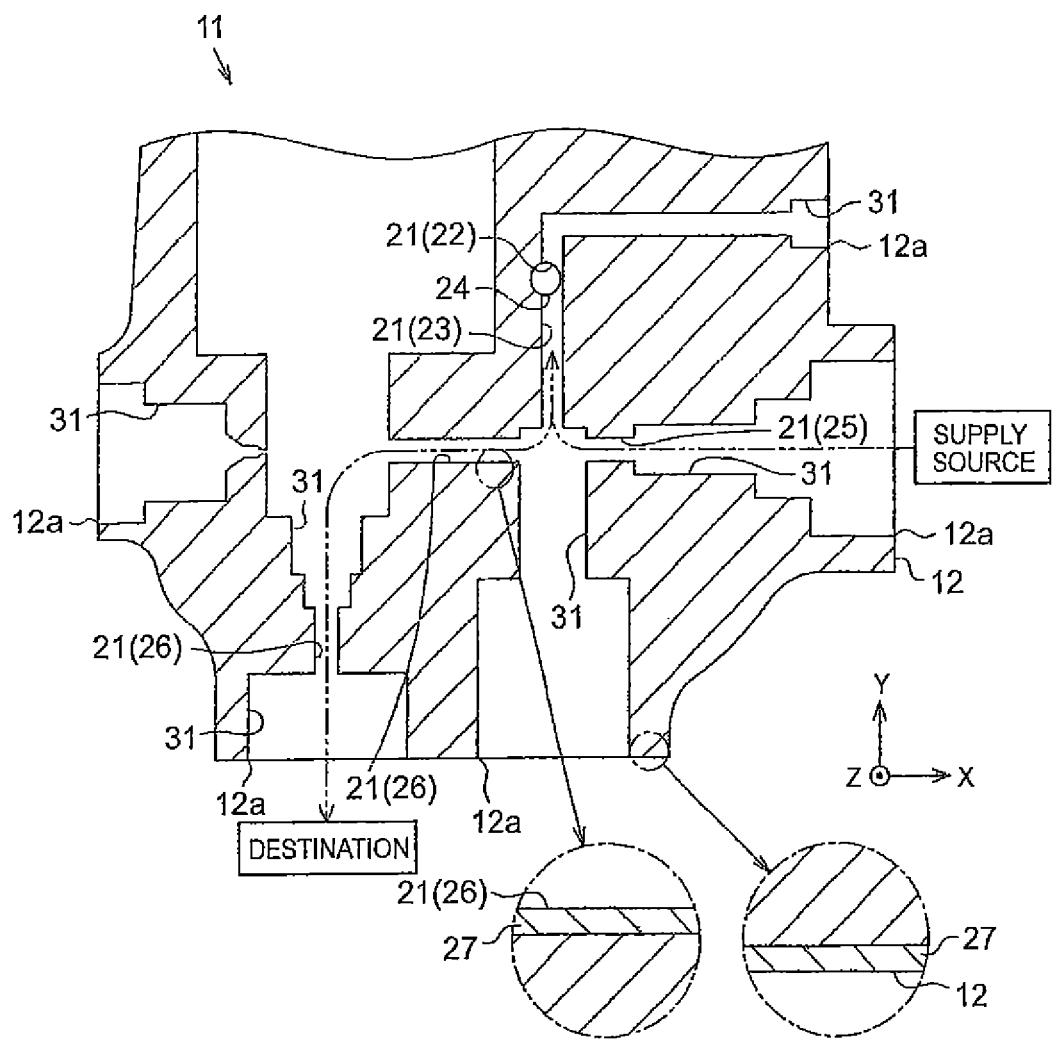
FIG. 1 is a partially cut sectional view of a valve main unit according to an embodiment.

Hereinafter, a valve main unit according to an embodiment of the present invention will be described with reference to the drawings. A valve main unit 11 shown in FIG. 1 is used in a valve device that controls a high-pressure hydrogen gas flow. The valve main unit 11 includes: a channel 21 for hydrogen gas; and valve housing portions 31 each of which is a part of the channel 21, and in each of which a high pressure valve is to be provided. The valve device includes the valve main unit 11 and the high pressure valves provided in the valve main unit 11. The valve device is connected to a hydrogen gas tank and a fuel cell that is a destination to which hydrogen gas is delivered (supplied). The valve device controls a flow of hydrogen gas that has been filled in the gas tank at a filling pressure of 70 MPa. Examples of the high pressure valve to be provided in the valve housing portion 31 include an electromagnetic valve and a check valve. The valve main unit 11 includes the valve housing portions 31 in which a pressure relief valve, a manual valve, a check valve, and a fusible plug valve are to be provided, respectively. A fuel cell system is constituted by the gas tank, the fuel cell, and the valve device including the valve main unit 11. The valve device is installed in a vehicle.

The valve main unit 11 will be described in detail. A channel 21 includes the valve housing portions 31 and has openings at the external surface 12 of the valve main unit 11. That is, the external surface 12 of the valve main unit 11 has openings 12a that communicate with the channel 21. Each of the valve housing portions 31 has a width larger than the widths of portions of the channel 21 other than the valve housing portions 31.

The channel 21 includes: a first channel 22 that extends in the Z-axis direction shown in FIG. 1 and is connected to the gas tank; and a second channel 23 that extends in the Y-axis direction shown in FIG. 1 and communicates with the first channel 22. A junction between the first channel 22 and the second channel 23 thus arranged constitutes an intersection portion 24.

The second channel 23 communicates with a third channel 25 that extends in the X-axis direction shown in FIG. 1 and that is a supply path through which hydrogen gas is supplied from an external supply source to the gas cylinder (gas tank). The second channel 23 communicates with a fourth channel 26 that extends in the X-axis direction shown in FIG. 1 and extends in the Y-axis direction shown in FIG. 1 toward the destination via the valve housing portion 31.

FIG. 1 includes an enlarged view of the internal surface of the channel 21. The internal surface is constituted by an oxidation layer 27 formed by performing anodizing on an aluminum-based alloy. Note that in FIG. 1, the thickness of the oxidation layer 27 is exaggerated.

A semifinished product is formed using an aluminum-based alloy to have the entire shape of the valve main unit 11, and the oxidation layer 27 is formed by performing anodizing on the semifinished product. In the semifinished product, the widths of portions of the channel 21 other than the valve housing portions 31 are in a range of, for example, 3 to 5 mm. The channel 21 according to this embodiment has a circular cross section shape, and the inside diameters of the portions of the channel 21 other than the valve housing portions 31 are set to be in a range of 3 to 5 mm. In the channel 21 of the semifinished product, the distance from each opening 12a to the intersection portion 24 is, for example, 150 mm or less.

Examples of the aluminum-based alloy that is a base material of the semifinished product include an aluminum alloy and a high-silicon aluminum alloy that contains 1% by mass or more of silicon. In view of hydrogen embrittlement resistance, this embodiment uses "A6061-T6" that is a kind of 6000 series (Al—Mg—Si-based) aluminum alloy defined according to JIS H14100 (2006), etc. With regard to components of the aluminum alloy (A6061-T6), Si content is 0.4% to 0.8% by mass; Fe content is 0.7% by mass or less; Cu content is 0.15% to 0.4% by mass; Mn content is 0.15% by mass or less; Mg content is 0.8% to 1.2% by mass; Cr content is 0.04% to 0.35% by mass; Zn content is 0.25% by mass or less; Ti content is 0.15% by mass or less; and the remainder is Al. The aluminum alloy (A6061-T6) has a tensile strength of 295 MPa or higher, a yield strength of 245 MPa or higher, and an elongation of 10%. The semifinished product is subjected to degreasing treatment as needed. Examples of the degreasing treatment include, organic solvent degreasing, detergent degreasing, sulfuric acid degreasing, electrolytic degreasing, phosphate degreasing, and alkaline degreasing. The semifinished product according to this embodiment is subjected to alkaline degreasing.

The oxidation layer 27 will be described in detail. FIG. 1 includes an enlarged view of the oxidation layer 27 of the channel 21. This oxidation layer 27 is formed by performing anodizing under a condition in which the oxidation layer 27 with a thickness of 8 μm or less is formed at the external surface 12 of the valve main unit 11. Anodizing is treatment for generating the oxidation layer (oxide coating) 27 at the surfaces (i.e., the internal surface of the channel 21 and the external surface 12) in the semifinished product by performing electrolysis of an electrolytic solution while the semifinished product soaked in an electrolytic bath is used as an anode. The anodizing condition, under which anodizing is performed, is set, for example, by conducting a preliminary test in which anodizing is preliminarily performed on an aluminum-based alloy test piece or a semifinished product, and measuring the thickness of the oxidation layer 27 at the external surface 12. Examples of the anodizing condition include a temperature of an electrolytic bath and a treatment time. For example, an eddy current coating thickness meter or a photomicrograph of a cross section may be used to determine the thickness of the oxidation layer 27.

The oxidation layer 27 of the channel 21 is formed by performing anodizing under a condition in which the oxidation layer 27 with a thickness of preferably 7 μm or less (more preferably 5 μm or less, and still more preferably 3 μm or less) is formed at the external surface 12 of the valve main unit 11.

The oxidation layer 27 of the channel 21 is preferably formed by performing anodizing under a condition in which the oxidation layer 27 with a thickness of 1 μm or more is formed at the external surface 12 of the valve main unit 11. It is preferable that the oxidation layer 27 of the channel 21 should have a thickness of 0.1 μm or more in terms of appropriately inhibiting corrosion of the channel 21 due to, for example, moisture.

Examples of the electrolytic bath used for anodizing include a sulfuric acid bath, a phosphate bath, a chromic acid bath, and an oxalic acid bath. A sulfuric acid bath is used as an electrolytic bath for anodizing according to this embodiment. A sulfuric acid concentration of the sulfuric acid bath is set to be in a range of 10 to 20% by mass.

In the electrolytic bath, stirring is performed using a stirring device and/or cooling is performed using a cooling device if necessary. Examples of the stirring device include a device that performs stirring using a mixing impeller and a device that performs stirring using compressed air. The electrolytic bath may be connected to a cooling device so as to circulate an electrolytic solution therebetween. This makes it possible to perform cooling and stirring simultaneously. In the electrolytic bath, an electrolytic solution may be forced to circulate within a channel of the semifinished product. In order to make the oxidation layer 27 thinner, it is preferable to perform anodizing without forcing the electrolytic solution to circulate within the channel of the semifinished product.

In the anodizing, as the temperature of the electrolytic bath increases, the hardness of the oxidation layer 27 decreases, and the oxidation layer 27 tends to have increased durability against a repeated load. Hence, it is advantageous to increase the temperature of the electrolytic bath. In this regard, the temperature of the electrolytic bath is preferably 5° C. or higher and more preferably 8° C. or higher.

In the anodizing, as the temperature of the electrolytic bath decreases, the hardness of the oxidation layer 27 increases, and the oxidation layer 27 tends to have increased heat resistance. Hence, it is advantageous to appropriately decrease the temperature of the electrolytic bath. In this regard, the temperature of the electrolytic bath is preferably 20° C. or less, more preferably 15° C. or less, and still more preferably 12° C. or less.

In view of the above, the temperature of the electrolytic bath is set to be preferably in a range of 5° C. to 20° C., more preferably in a range of 5° C. to 15° C., and still more preferably in a range of 8° C. to 12° C. The hardness of the oxidation layer 27 of the channel 21 is preferably 410 Hv or less and more preferably 360 Hv to 410 Hv. The hardness represented by a unit Hv indicates a Vickers hardness defined according to JIS Z2244 (2009).

In order to increase strength of the oxidation layer 27, for example, the oxidation layer 27 is preferably subjected to sealing treatment. Examples of the sealing treatment include nickel acetate sealing, steam sealing, boiling water sealing, dichromate sealing, and sodium silicate sealing. Nickel acetate sealing is used as the sealing treatment in this embodiment.

Test examples in which the oxidation layer is formed by anodizing will be described. First, a preliminary test for oxidation layer formation (a confirmation test for oxidation layer formation) was conducted as follows.

A sample, which was made of an aluminum alloy (A6061-T6) and had a channel, was prepared. The channel had a width of 3 mm and a depth (length from the opening 12a to the intersection portion 24) of approximately 130 mm. The sample was subjected to weak alkaline degreasing, washing, and then anodizing (hard sulfuric-acid-anodized aluminum treatment). In the anodizing, the temperature condition for an electrolytic bath was set to 10° C. and a current density was set to 1.3 A/dm$^2$. A treatment time for the anodizing was set such that an oxidation layer (hard sulfuric-acid-anodized aluminum layer) at the external surface of the sample had a thickness of approximately 5 μm. The anodizing was performed without forcing an electrolytic solution to circulate within the channel. The oxidation layer thus produced was subjected to nickel acetate sealing.

In the obtained sample, the oxidation layer with a thickness of approximately 3.5 μm was formed in the channel at a position near an opening of the external surface. In addition, the oxidation layer with a thickness of approximately 2 μm was formed at an intermediate portion between the opening and the intersection portion. Further, the oxidation layer with a thickness of approximately 2 μm was formed at a portion near the intersection portion, which was the inner portion farthest from the opening. These results show that the oxidation layer was formed at any portion of the channel since electrolysis occurred in the electrolytic solution with which the channel was filled, during anodizing.

Test Examples 1 to 3

In Test Example 1, a test piece made of the aluminum alloy (A6061-T6) was subjected to anodizing in the same manner as in the above "preliminary test for oxidation layer formation" except that the temperature condition for the electrolytic bath was changed to 5° C., and thus, an oxidation layer with a thickness of approximately 5 μm was formed. Note that in this Test Example 1 and the following Test Examples, the oxidation layer was subjected to nickel acetate sealing. A shape of each test piece used in this Test Example 1 and the following Test Examples was set according to the "metal plate bending fatigue test" in JIS Z2275 (1978).

In Test Examples 2 and 3, a test piece having an oxidation layer with a thickness of approximately 9 μm and a test piece having an oxidation layer with a thickness of approximately 14 μm were produced in the same manner as in Test Example 1 except that the treatment time for the anodizing was changed.

Test Examples 4 to 6

In Test Examples 4 to 6, an oxidation layer was formed in each test piece in the same manner as in Test Examples 1 to 3 except that the temperature condition for the electrolytic bath was changed to 10° C.

Test Examples 7 to 9

In Test Examples 7 to 9, an oxidation layer was formed in each test piece in the same manner as in Test Examples 1 to 3 except that the temperature condition for the electrolytic bath was changed to 20° C.

(Comparative Results on Durability) A plate bending fatigue test was conducted on each of the test pieces obtained in Test Examples 1 to 9 using a plate bending fatigue tester. Then, a safety factor of each of the test pieces was calculated to compare their durability. The safety factor was calculated based on the results of simulation of the fatigue (repeated load) in the channel of the valve main unit provided in a vehicle. The safety factor was set to "1" when the test piece met the requirement of desired durability as a material for the valve main unit. As the safety factor is higher, the durability of the material is higher.

Figure 2:
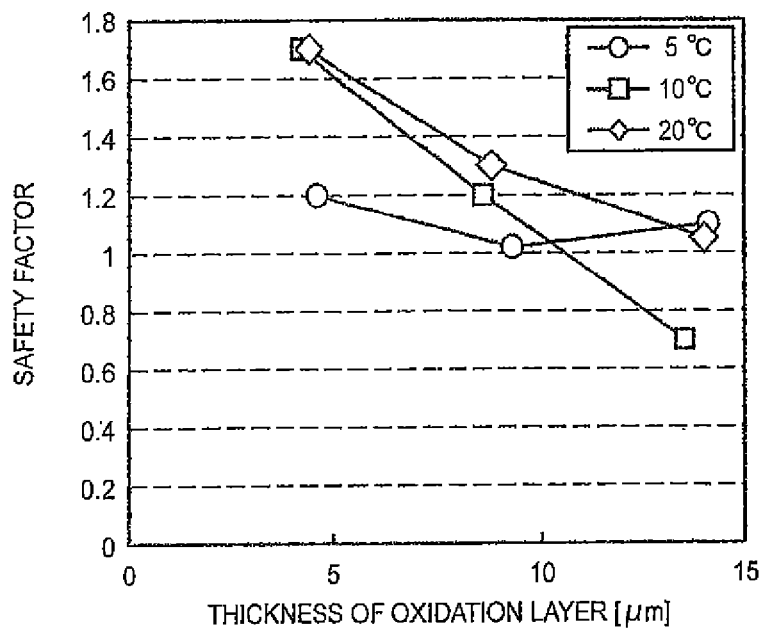
FIG. 2 is a graph showing evaluation results on test pieces subjected to anodizing under various temperature conditions for an electrolytic bath, the graph indicating a correlation between the thickness of an oxidation layer and a safety factor.

FIG. 2 shows that as the thickness of the oxidation layer became thinner, the safety factor tended to increase. It was confirmed that the oxidation layer with a thickness of approximately 8 μm or less was likely to achieve a high level of durability.

(Comparative Results on Cracking Resistance) With regard to each of the test pieces obtained in Test Examples 1 to 9, the cracking temperature at which a crack occurred was determined.

Figure 3:
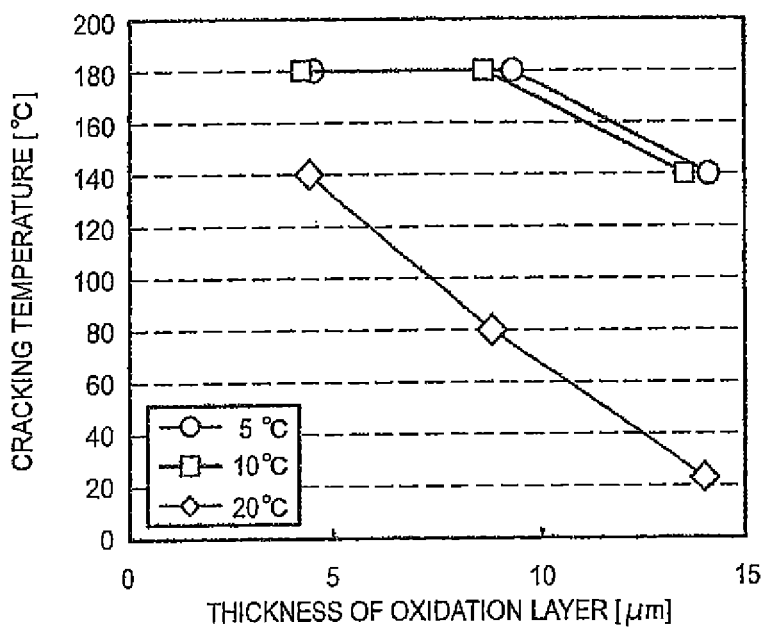
FIG. 3 is a graph showing evaluation results on test pieces subjected to anodizing under various temperature conditions for the electrolytic bath, the graph indicating a correlation between the thickness of an oxidation layer and a cracking temperature.

FIG. 3 shows that the cases where the temperature condition for the electrolytic bath was 5° C. or 10° C. were more advantageous in heat resistance than the case where the temperature condition was 20° C.

(Hardness of Oxidation Layer) In each of the test pieces obtained in Test Examples 1 to 9, a Vickers hardness of the oxidation layer was measured. The results show that in each of the test pieces obtained in Test Examples 1 to 3, the oxidation layer had a hardness of 424 Hv; in each of the test pieces obtained in Test Examples 4 to 6, the oxidation layer had a hardness of 360 Hv; and in each of the test pieces obtained in Test Examples 7 to 9, the oxidation layer had a hardness of 302 Hv.

The functions in the present invention will be described. FIG. 1 includes the enlarged view of the oxidation layer 27 of the channel 21. The oxidation layer 27 is formed by performing anodizing under the condition in which the oxidation layer 27 with the thickness of 8 μm or less is formed at the external surface 12 of the valve main unit 11. This configuration allows the oxidation layer 27 of the channel 21 to be formed at a thickness of 8 μm or less. For example, a semifinished product may be subjected to anodizing in an electrolytic bath. In this case, an electrolytic solution is less likely to circulate (substitution is less likely to occur) in a channel of the semifinished product than in the outside of the semifinished product. Accordingly, the oxidation layer 27 of the channel 21 is likely to be thinner than the oxidation layer 27 at the external surface 12. That is, in the valve main unit 11, since the thickness of the oxidation layer 27 of the channel 21 is set to be small, the increased durability of the oxidation layer 27 against the plate bending fatigue is easily obtained.

In general, when anodizing is performed, a barrier layer is first formed on an aluminum-based alloy and a porous layer is then formed. Thus, in general, an oxidation layer formed by anodizing has a structure in which the barrier layer and the porous layer are stacked and the bottom portion of the porous layer is on the barrier layer. Even the oxidation layer 27 formed to have the small thickness as described above includes at least one barrier layer. Consequently, the channel 21 has increased corrosion resistance. This makes it possible to suppress occurrence of corrosion of the channel 21 due to, for example, the moisture in hydrogen gas.

The advantageous effects of the embodiment will be described. (1) The oxidation layer 27 of the channel 21 is formed by performing anodizing under the condition in which the oxidation layer 27 with the thickness of 8 μm or less is formed at the external surface 12 of the valve main unit 11. Thus, it is possible to easily increase the durability of the gas channel 21 for hydrogen gas against the repeated load applied due to the operation of the high pressure valve.

(2) The channel 21 has the intersection portion 24 that is a junction inside the valve main unit 11. Stress is likely to concentrate in the intersection portion 24 when the repeated load is applied to the channel 21 due to the operation of the high pressure valve. Hence, the oxidation layer 27 of the channel 21 according to the embodiment is particularly advantageous in increasing the durability of the valve main unit 11 having the channel 21 including the intersection portion 24.

(3) The temperature of the electrolytic bath for anodizing is preferably in the temperature range of 5° C. to 20° C. In this case, it is possible to easily increase heat resistance (cracking resistance during beating) of the oxidation layer 27. (4) The valve main unit 11 according to the embodiment is advantageous in reducing the weight of a vehicle since the base material of the valve main unit 11 is an aluminum-based alloy. In order to extend a cruising distance and make a vehicle compact, a gas tank that stores a high-pressure hydrogen gas is used in an in-vehicle fuel cell system. In a valve device connected to such a gas tank, a load due to a repeated load is high. In this regard, however, the valve main unit 11 according to this embodiment includes the channel 21 having the above-described oxidation layer 27. This makes it possible to extend a replacement cycle of the valve device (valve main unit 11). Hence, the valve main unit 11 according to this embodiment is particularly advantageous as the valve main unit 11 used in an in-vehicle valve device.

Note that the above embodiments can be implemented in the following appropriately modified embodiments. In the valve main unit 11, the number of the valve housing portions 31 or the number of the intersection portions 24 is not particularly limited. The number of the valve housing portions 31 may be one or more, and the number of the intersection portions 24 may be one or more.

The channel 21 in the valve main unit 11 has the intersection portion 24, but the channel that does not include the intersection portion 24 may be formed. The intersection portion 24 is the junction between the first channel 22 that extends in the Z-axis direction and the second channel 23 that extends in the Y-axis direction. The angle between channels is not limited to a right angle. If the intersection portion is a junction of a plurality of channels that extend in different directions, stress is likely to concentrate in this intersection portion. Accordingly, the above-described oxidation layer 27 is particularly advantageous in increasing the durability of the channel.

The above-described intersection portion 24 is the junction of the channels of the channel 21, which have different widths. However, the intersection portion may be a junction of channels of the channel 21, which have the same width. The oxidation layer 27 is formed all over the external surface 12 of the valve main unit 11. However, the oxidation layer 27 may be formed at part of the external surface 12. For example, a semifinished product having the external surface 12 partially coated with a non-conductive material is subjected to anodizing to form the oxidation layer 27 at part of the external surface 12.

The valve main unit 11 can be used in a valve device that controls hydrogen gas filled in a gas cylinder at a filling pressure of 70 MPa, but the valve device in which the valve main unit 11 can be used is not limited thereto. The valve main unit 11 may be used in a valve device that controls hydrogen gas filled in a gas cylinder at a filling pressure lower than 70 MPa, or higher than 70 MPa. Even if the hydrogen gas has a pressure lower than 70 MPa, a repeated load is applied to the channel 21 due to the operation of the high pressure valve. Thus, the valve main unit 11 is advantageous. Note that the valve main unit 11 is suitably used as a valve main unit for a valve device that controls hydrogen gas at a pressure equal to or higher than 30 MPa.

The valve main unit 11 may be used in an in-vehicle valve device. However, the valve main unit 11 can be used in equipment that supplies hydrogen to a vehicle, for example, a hydrogen station. Next, technical ideas that can be understood from each of the embodiments and additional embodiments will be described.

(i) The valve main unit wherein the channel has the intersection portion that is a junction inside the valve main unit.

(ii) The valve main unit wherein the oxidation layer of the channel is formed by performing anodizing using the electrolytic bath, and the temperature of the electrolytic bath is in the temperature range of 5° C. to 20° C.

(iii) The valve main unit wherein the oxidation layer of the channel is formed by performing anodizing under the condition in which the oxidation layer with a Vickers hardness of 360 Hv to 410 Hv is formed at the external surface of the valve main unit, the external surface having the opening communicating with the channel.

(iv) The valve main unit wherein the oxidation layer of the channel is subjected to nickel acetate sealing.

(v) A method of manufacturing a valve main unit which includes a channel for hydrogen gas and in which a high pressure valve is to be provided, wherein an internal surface of the channel is constituted by an oxidation layer, the method including: producing a semifinished product using an aluminum-based alloy; and performing anodizing on the semifinished product, wherein the anodizing is performed under a condition in which the oxidation layer with a thickness of 8 μm or less is formed at an external surface of the valve main unit, the external surface having an opening communicating with the channel.

What is claimed is:

1. A valve main unit in which a high pressure valve is to be provided, comprising a channel for hydrogen gas, wherein:
the channel includes an internal surface that is constituted by an oxidation layer formed by performing anodizing on an aluminum-based alloy in an electrolytic solution; and the oxidation layer of the channel is formed by performing the anodizing under a condition in which the oxidation layer with a thickness in a range of 1 to 8 µm is formed at an external surface of the valve main unit, the external surface having an opening communicating with the channel, the oxidation layer of the channel being thinner than the oxidation layer formed at the external surface.

2. The valve main unit according to claim 1, wherein the oxidation layer of the channel is formed by performing the anodizing using an electrolytic bath, and a temperature of the electrolytic bath is in a temperature range of 5° C. to 20° C.

3. The valve main unit according to claim 2, wherein the temperature of the electrolytic bath is in a temperature range of 5° C. to 15° C.

4. The valve main unit according to claim 3, wherein the temperature of the electrolytic bath is in a temperature range of 8° C. to 12° C.

5. A method of manufacturing a valve main unit which includes a channel for hydrogen gas and in which a high pressure valve is to be provided, wherein the channel includes an internal surface that is constituted by an oxidation layer, the method comprising:
    producing a semifinished product using an aluminum-based alloy; and
    performing anodizing on the semifinished product, wherein:
        the anodizing is performed in an electrolytic solution under a condition in which the oxidation layer with a thickness in a range of 1 to 8 µm is formed at an external surface of the valve main unit, the oxidation layer of the channel being thinner than the oxidation layer formed at the external surface, and
        the external surface has an opening communicating with the channel.

* * * * *

UNITED STATES PATENT AND TRADEMARK OFFICE
CERTIFICATE OF CORRECTION

PATENT NO. : 9,874,289 B2
APPLICATION NO. : 14/541506
DATED : January 23, 2018
INVENTOR(S) : Kazuhisa Sugiyama et al.

It is certified that error appears in the above-identified patent and that said Letters Patent is hereby corrected as shown below:

On the Title Page

The 2nd Assignee (73) incorrectly spelled "TOYOTA JIDOSHA KABUSIIIKI KAISIIA" should be ---TOYOTA JIDOSHA KABUSHIKI KAISHA---

Signed and Sealed this
Twenty-ninth Day of May, 2018

Andrei Iancu
*Director of the United States Patent and Trademark Office*